(12) United States Patent
Keyes et al.

(10) Patent No.: US 9,745,184 B2
(45) Date of Patent: Aug. 29, 2017

(54) FLUID DISPENSING APPARATUS WITH PRE-HEATED VALVE

(71) Applicant: Acertacorp LLC, Sarasota, FL (US)

(72) Inventors: Denis E. Keyes, Sarasota, FL (US); John R. Randall, Jr., Freehold, NJ (US)

(73) Assignee: ACERTACORP LLC, Sarasota, FL (US)

(*) Notice: Subject to any disclaimer, the term of this patent is extended or adjusted under 35 U.S.C. 154(b) by 158 days.

(21) Appl. No.: 14/482,027

(22) Filed: Sep. 10, 2014

(65) Prior Publication Data
US 2016/0068284 A1    Mar. 10, 2016

(51) Int. Cl.
| F16K 49/00 | (2006.01) |
| B67D 1/00 | (2006.01) |
| G05D 23/19 | (2006.01) |
| B65B 3/06 | (2006.01) |
| B65B 3/36 | (2006.01) |

(52) U.S. Cl.
CPC .............. *B67D 1/0012* (2013.01); *B65B 3/06* (2013.01); *B65B 3/36* (2013.01); *B67D 1/0011* (2013.01); *G05D 23/19* (2013.01)

(58) Field of Classification Search
CPC ..... B65B 3/34; B65B 3/26; B65B 3/36; F16B 31/02; F16K 49/00; G05D 23/19; B05C 5/001
USPC ............................... 222/1, 146.1, 146.2, 593
See application file for complete search history.

(56) References Cited

U.S. PATENT DOCUMENTS

| 5,485,542 | A | | 1/1996 | Ericson |
| 6,152,376 | A | * | 11/2000 | Sandelman ........ G05D 23/1921 236/68 R |
| 6,520,382 | B2 | * | 2/2003 | Estelle .................... B05C 5/001 222/146.1 |
| 2001/0023876 | A1 | | 9/2001 | Estelle et al. |

* cited by examiner

*Primary Examiner* — Paul R Durand
*Assistant Examiner* — Robert Nichols, II
(74) *Attorney, Agent, or Firm* — Coats & Bennett, PLLC

(57) ABSTRACT

A dispensing device that dispenses a predetermined volume of fluid into a receptacle has a valve that controls the flow of the fluid through the device. The valve is pre-heated to a calculated operating temperature before dispensing operations begin. Once the temperature of the valve reaches the calculated operating temperature, the device begins dispensing the fluid. The valve is maintained at that calculated temperature during dispensing operations.

14 Claims, 9 Drawing Sheets

| SYMBOL | VALVE TIME ON (SECONDS) | VALVE TIME OFF (SECONDS) | DUTY CYCLE | MAX TEMPERATURE |
|---|---|---|---|---|
| × | 0.5 | 3 | 14% | 95 |
| ✳ | 0.5 | 1.5 | 25% | 110 |
| ▲ | 1 | 2 | 33% | 118 |
| ● | 1 | 1.5 | 40% | 125 |
| ■ | 1 | 1 | 50% | 140 |

FLUID DISPENSING APPARATUS WITH PRE-HEATED VALVE

FIELD OF THE INVENTION

This disclosure relates generally to fluid dispensing devices, and more particularly, to fluid dispensing devices that dispense a predetermined volume of fluid using pre-heated valves.

BACKGROUND

Many conventional fluid dispensing devices utilize electronic valves or pinch valves together with some type of flexible tubing, such as silicon tubing, to dispense a predetermined volume of a fluid into a receptacle. For example, one such device currently in use is known as a time/pressure filler. Generally, time/pressure fillers dispense a predetermined volume of fluid from a reservoir through a compressible tube enclosed in a pinch valve. Particularly, the pinch valve is energized causing it to open for a predetermined period of time to dispense the fluid into a receptacle, and then de-energized causing it to close for another predetermined period of time to cease dispensing the fluid into the receptacle. Assuming that the pressure within the fluid reservoir remains constant, an equal volume of fluid should be dispensed into the receptacle each time the dispensing "cycle" (i.e., the energizing/opening and de-energizing/closing of the pinch valve) is repeated.

A second type of fluid dispensing device is known as a volumetric fluid dispensing device. These types of fluid dispensing devices first measure a predetermined volume of fluid using one or more optical sensors, for example. More particularly, the fluid flows from a fluid reservoir and into a fill tube that holds a premeasured volume of fluid. The sensors, which may be proximate the fill tube, detect the level of fluid in the fill tube and generate signals indicating those detected levels to a processor. The processor, in response to those signals, then controls a pinch valve with the compressible tubing to open and close thereby controlling the flow of fluid into and out of the fill tube.

Another type of fluid dispensing device is known as a Time Dispense device. These types of dispensing devices are similar to the volumetric fluid dispensing devices. However, rather than premeasuring a volume of fluid to be dispensed using one or more sensors, Time Dispense devices control the valves using a timer. Specifically, these devices dispense a fluid by opening and closing a dispense valve for specific predetermined periods of time. While the valve is opened, the fluid flows into a waiting receptacle until the dispense valve is closed.

Each of these of fluid dispensing devices has advantages, such as speed and/or volume. However, each also has a tendency to cause variances in the volumes of fluid dispensed.

SUMMARY

Embodiments of the present disclosure provide a fluid dispensing apparatus, and a corresponding method, for dispensing a predetermined volume of fluid into a fluid receptacle such as a bottle or container.

In one embodiment, a method for dispensing a predetermined volume of fluid is provided. Particularly, a target operating temperature is computed for a valve of a fluid dispensing apparatus. Once the target operating temperature is computed, the valve is pre-heated to the target operating temperature. Pre-heating the valve is performed prior to dispensing the predetermined volume of fluid.

To compute the target operating temperature, one embodiment determines a duty cycle for the valve. In this embodiment, the duty cycle is defined by a time that the valve is open relative to a total time that the valve is open and closed for a cycle. The target operating temperature may then be computed based on that duty cycle. In some embodiments, the target operating temperature may further be based on a type of valve.

In one embodiment, the target operating temperature is computed by determining an equilibrium temperature for the valve at each of a plurality of different duty cycles. These equilibrium temperatures are then associated with the corresponding duty cycle for which it was determined, and the association stored in a memory circuit accessible to the fluid dispensing apparatus. Thereafter, the target operating temperature for the valve may be set to the equilibrium temperature associated with the duty cycle for the valve.

In one embodiment, the valve is pre-heated to the target operating temperature before dispensing the predetermined volume of fluid by determining whether a current operating temperature of the valve equals or exceeds the target operating temperature computed for the valve. Dispensing the predetermined volume of fluid is delayed if the current temperature of the valve is less than the target operating temperature computed for the valve. However, if the current temperature of the valve is not less than the target operating temperature computed for the valve, the fluid dispensing apparatus dispenses the predetermined volume of fluid. The valve is then maintained at the target operating temperature while the fluid dispensing apparatus dispenses the predetermined amount of fluid.

Pre-heating the valve may be accomplished using any known method. However, in one embodiment, the valve is energized using a voltage that is less than the voltage required to open the valve until the temperature of the valve equals or exceeds the target operating temperature computed for the valve.

Additionally, the present disclosure also provides a fluid dispensing apparatus configured to dispense a predetermined volume of fluid into a receptacle. The fluid dispensing apparatus, in one embodiment, comprises a fluid reservoir to hold a fluid to be dispensed, a conduit to carry the fluid through the fluid dispensing apparatus, a valve configured to control the flow of the fluid through the conduit, and a processing circuit. The processing circuit is configured, in one embodiment, to compute a target operating temperature for the valve, and pre-heat the valve to the target operating temperature before dispensing the predetermined volume of fluid.

In one embodiment, the fluid dispensing apparatus of claim 9 is configured to compute the target operating temperature for the valve by determining a duty cycle for the valve. In this embodiment, the duty cycle is defined by a time that the valve is open relative to a total time that the valve is open and closed for a cycle. Once the duty cycle is determined, the processing circuit computes the target operating temperature based on the duty cycle for the valve. In some embodiments, the fluid dispensing apparatus also computes the target operating temperature based on valve type.

In one embodiment, the processing circuit determines an equilibrium temperature for the valve at each of a plurality of different duty cycles. The processing circuit then associates the equilibrium temperature with the corresponding duty cycle, and stores the association in a memory circuit accessible to the dispensing device. Thereafter, the processing circuit may set the target operating temperature for the valve to the equilibrium temperature associated with the duty cycle.

In one embodiment, the processing circuit determines whether a current operating temperature of the valve equals or exceeds the target operating temperature computed for the valve. The processing circuit delays the dispensing of the predetermined volume of fluid if the current temperature of the valve is less than the target operating temperature computed for the valve, and dispenses the predetermined volume of fluid if the current temperature of the valve is not less than the target operating temperature computed for the valve. The processing circuit is further configured to maintain the valve at the target operating temperature while the dispensing device is dispensing the predetermined amount of fluid.

In one embodiment, the processing circuit energizes the valve using a voltage that is less than that required to open the valve until the temperature of the valve equals or exceeds the target operating temperature computed for the valve.

In another aspect, the present disclosure also provides a method for pre-heating a valve. In this embodiment, a duty cycle for the valve is determined, wherein the duty cycle is defined by a time that the valve is open relative to a total time that the valve is open and closed for a cycle. The method then computes a target operating temperature for the valve based on the duty cycle, and pre-heats the valve to the target operating temperature prior to opening the valve. When the valve is at the target operating temperature, the valve is opened.

The target computing temperature is computed, in one embodiment, using $$y=mx+b$$

where:
  y is the computed target operating temperature;
  m is the slope of a regression line;
  x is the Duty Cycle expressed as a percentage; and
  b is the y-intercept.

Of course, those skilled in the art will appreciate that the present invention is not limited to the above contexts or examples, and will recognize additional features and advantages upon reading the following detailed description and upon viewing the accompanying drawings.

DETAILED DESCRIPTION

Embodiments of the present disclosure provide a method and device for dispensing a predetermined volume of a fluid into a receptacle, such as a bottle or container, for example. The dispensing device comprises, inter alia, flexible, compressible tubing (e.g., silicon tubing) that carries the fluid through the device, and one or more electronic valves (e.g., electronically operated pinch valves) that are controlled to "open" and "close" to effect the flow of fluid through the apparatus.

To accurately dispense the predetermined volume of fluid into the receptacle, a fluid dispensing device configured according to embodiments of the present disclosure preheats one or more of the valves to a predetermined target operating temperature before dispensing the fluid into the receptacle. The target temperatures may be computed, for example, based on the type of valve that is being used and on an amount of time that the valve is "on" or "open." Different valves may or may not have different target operating temperatures. However, once the valves have reached their target operating temperatures, the dispensing device may dispense the fluid into the receptacle. Thereafter, the device maintains the valves at the target operating temperatures until dispensing operations cease.

Preheating the valves to a target operating temperature, and then maintaining those valves at that operating temperature, helps to avoid undesirable dispensing errors during dispensing operations in which the actual volume of fluid that is dispensed by the device is more or less than a desired volume of fluid.

Figure 1:
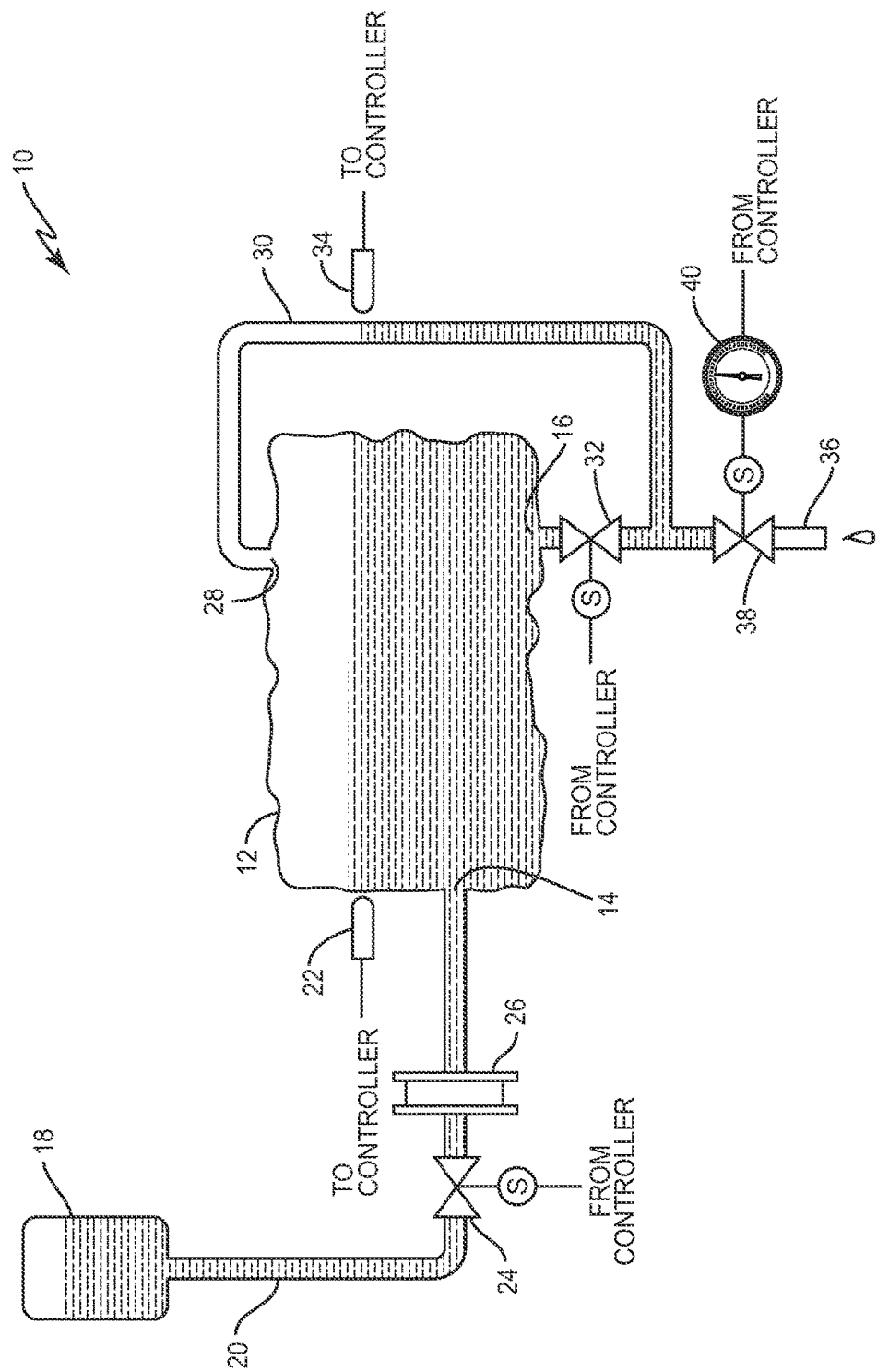
FIG. 1 illustrates a fluid dispensing apparatus configured according to one embodiment of the present disclosure.

Turning now to the drawings, FIG. 1 is a block diagram illustrating a time-volumetric dispensing device 10 configured according to one embodiment of the present disclosure. Those skilled in the art should appreciate that the present disclosure is not limited for use only with these specific types of fluid dispensing devices, but rather, may be utilized in conjunction with any other type of fluid dispensing apparatus, such as time/pressure filler devices, volumetric dispensing devices, and the like. Further, in accordance with the present disclosure, all parts of a dispensing device 10 that come into contact with the fluid being dispensed remain clean, sterile, and disposable.

The fluid dispensing device 10 comprises a fluid reservoir 12 having an inlet 14 and an outlet 16. The inlet 14 is connected to a fluid source 18 that supplies the fluid to reservoir 12 via a supply conduit 20. The outlet 16 is connected to a fill tube 30. In general, fluid source 18 supplies the fluid to be dispensed to the fluid reservoir 12. In turn, the fluid reservoir 12 discharges fluid through the outlet 16 into the fill tube. As described later in more detail, the fill tube 30 holds a predetermined volume of fluid that is dispensed through a dispense tube 36 into one or more fluid receptacles, such as bottles or containers.

In this embodiment, fluid reservoir 12 comprises a flexible fluid reservoir that holds the supply of fluid to be dispensed. Because fluid reservoir 12 is flexible, it may expand as fluid is added from fluid source 18, and contract as fluid is discharged into the fill tube 30. Therefore, a sensor 22 may be disposed proximate fluid reservoir 12 to monitor and control the volume of fluid contained within fluid reservoir 12 such that it maintains a generally constant volume.

For example, in one embodiment, sensor 22 comprises an optical sensor that detects when the level of the fluid in fluid reservoir 12 falls below a predetermined level. When this occurs, the sensor 22 generates a signal to a programmable controller that, in turn, generates a control signal that causes fluid source 18 to supply additional fluid. Particularly, the controller is communicatively connected to a solenoid S and a supply valve 24 disposed along the supply conduit 20. The control signal causes the supply valve 24, which may be an electronic pinch valve, for example, to open. With the supply valve 24 open, fluid from the fluid source 18 flows through a sterilization or clarification filter 26 and into the reservoir 12. When sensor 22 detects that the fluid level has returned to the predetermined level, sensor 22 generates another signal to the controller. In response, the processing circuit generates another control signal to close the supply valve 24 to stop the flow of fluid from flowing into the reservoir 12.

The fill tube 30, as stated previously, is connected to the bottom part of reservoir 12 via outlet 16. The other end of the fill tube 30 is connected to a vent port 28 formed in an upper part of the reservoir 12. Thus, the fill tube 30 forms a closed loop with the fluid reservoir 12. Because the fill tube 30 forms a closed loop with reservoir 12, it eliminates the need to vent the reservoir 12 to the ambient atmosphere. It also tends to isolate the fluid in the fill tube 30 from the fluid in reservoir 12, and minimizes the turbulence that occurs while reservoir 12 is being re-supplied with fluid from the fluid source 18. This helps to accurately maintain the fluid inside fill tube 30 at the predetermined level.

The fill tube 30 holds the fluid to be dispensed into the receptacles. To control the flow of fluid into the fill tube 30 from reservoir 12, a fill valve 32 is disposed in the closed loop fill tube 30. The fill valve 32, which may also comprise an electronic pinch valve, is operatively connected to the controller via a solenoid S and opens and closes according to control signals received from the controller. When open, the fill valve 32 allows fluid to enter the fill tube. When closed, the fill valve 32 prevents the fill tube 30 from being filled with fluid from reservoir 12.

A fluid level sensor 34 is disposed along the fill tube 30. The sensor 34, which may be an optical sensor, for example, may be positioned at any point desired along the fill tube 30; however, in this embodiment, the sensor 34 is located at an upper position along fill tube 30. In this position, the sensor 34 detects when the fluid in the fill tube 30 reaches a predetermined upper fill level.

A dispense tube 36 connects to the fill tube 30 via a dispense valve 38, which may be, for example, an electronic pinch valve configured according to the present disclosure. A timer 40, which is connected to the programmable controller, may be present to help control the operations of the dispense valve 38. Particularly, the programmable controller may utilize the timer 40 to measure a time for discharging the fluid from the fill tube 30 starting from a predetermined fluid level in the fill tube 30. To accomplish this, the controller will start the timer 40 and generate a control signal when the fluid in the fill tube 30 is at the predetermined upper level to energize or open the dispense valve 38 via solenoid S. While open, fluid is allowed to flow from the fill tube 30 and into the bottles or containers via dispense tube 36; however, in this embodiment, the fluid will be dispensed only for a predetermined time. When the predetermined time period has elapsed, the timer 40 generates a signal to inform the controller that time has expired. In response, the controller generates a control signal to de-energize or close the dispense valve 38, thereby ceasing the dispensing of the fluid into the bottles or containers.

Figure 2:
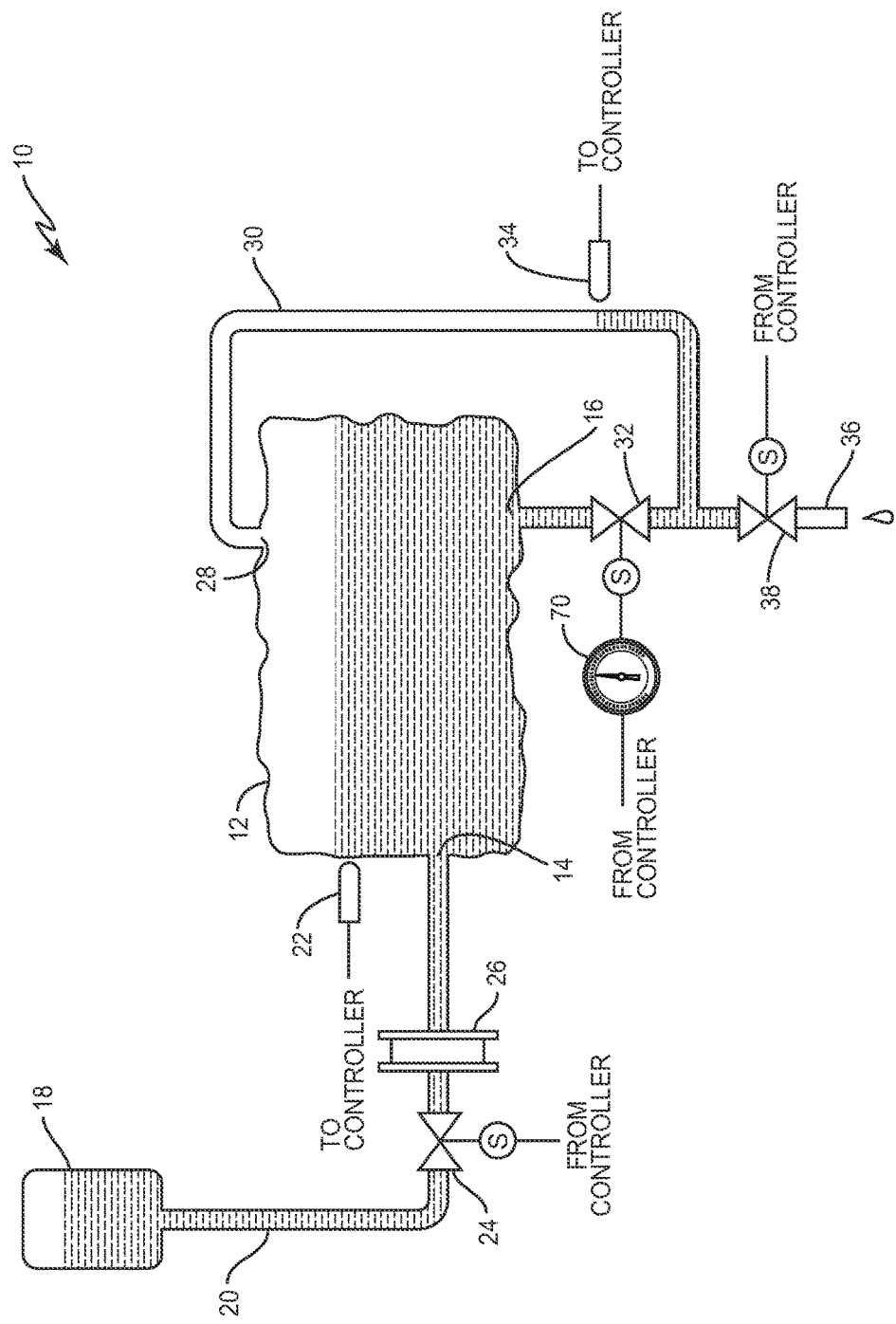
FIG. 2 illustrates a fluid dispensing apparatus configured according to another embodiment of the present disclosure.

FIG. 2 illustrates another embodiment of the dispensing device 10 configured to dispense a predetermined volume of fluid according to the present disclosure. In this embodiment, the sensor 34 is positioned at a lower portion of the fill tube 30, rather than along an upper portion. Additionally, the timer 40 from FIG. 1 has been removed and replaced by a timer 70. In this configuration, the timer 70 is utilized for measuring a time for supplying the fluid from the fluid reservoir 12 to the fill tube 30 starting from a predetermined fluid level in the fill tube. To accomplish this, the controller controls the fill valve 32, which may comprise an electronic pinch valve configured according to the present disclosure, to open and close (i.e., energize the fill valve to open, and de-energize the fill valve to close). Specifically, the controller generates signals to start the timer 70 and to open the fill valve 32. When opened, the fill valve 32 allows the fill tube 30 to fill with fluid, but only until the timer 70 expires. When the timer 70 expires, the fill tube 30 is filled with the fluid for dispensing into the bottles or containers. The controller then closes the fill valve 32 to stop the flow of fluid from the reservoir 12 into the fill tube 30, and opens the dispense valve 38 to dispense a predetermined volume of fluid from the fill tube 30 into the bottles or containers. The device 10 will continue dispensing the fluid until the sensor 34 detects the falling level of the fluid in the fill tube 30. Upon detecting the fluid, sensor 34 generates a signal to the controller, which in turn, generates the control signal to close the dispense valve 38 and cease dispensing the fluid.

As previously stated, conventional fluid dispensing devices utilize electronic valves or electronic pinch valves in combination with flexible tubing for conduits that carry the fluid through the devices. The valves on these conventional devices, however, tend to exhibit a behavior that can result in a dispensing error. Particularly, most, if not all, valves that are responsible for controlling the flow of fluid through the device have a coil that is energized to open the valve, and de-energized to close the valve, in response to one or more received signals. This repeated opening and closing of the valve during dispensing operations causes the temperature of the coil to increase. The change in temperature is gradual, but it is enough to cause the dispensed volumes of a fluid to vary between the times when the dispensing process first begins, or after the valve has been idle for an extended period, and after the dispensing operations have been ongoing for some time.

In more detail, the coil of a given valve is at ambient temperature prior to the start of a normal dispensing operation. Once dispensing begins, the valves repeatedly open and close, and thus, the temperatures of their associated valve coils begin to gradually increase. Eventually, the valve coil will reach its normal operating temperature; but until then, the dispensed volume of the fluid (which may be measured by weight) will vary. This is because the reaction time of the valve changes with the change in the temperature of the valve coil. That is, valves at a cooler temperature may be slower to open and close than when they are at a higher temperature. This changing reaction time results in the undesirable variation of the dispensed volume of the fluid.

There have been past attempts at minimizing such temperature increases using various means. For example, some conventional devices utilize cooling fins or heat sinks attached to the body of the valve to dissipate the heat. Another method uses a device commonly known as a COLD CUBE. Particularly, a COLD CUBE is a device that reduces an operating voltage to a given valve coil after the valve coil is initially energized to open. These conventional methods, however, simply reduce the maximum operating temperature of the valve. None have been successful at averting or controlling the gradual change in valve temperature that occurs after the start of dispensing operations, and therefore, none successfully control the resultant variation in the volumes of the dispensed fluid.

The fluid dispensing device 10 according to the present disclosure addresses this gradual change in valve temperature to ensure that substantially a same volume of fluid is being dispensed by the device 10 throughout the dispensing operation. More specifically, one or more valves of the dispensing device 10 are preheated to a predetermined target operating temperature prior to the start of a dispensing operation. Once the valves reach the target operating temperature, the dispensing device 10 may begin dispensing the fluid in the fluid reservoir 12 into a receptacle. The dispensing device 10 then maintains the valve at the target operating temperature throughout dispensing operations. Thus, the volume of fluid that is dispensed into a receptacle at the beginning of dispensing operations is substantially the same as the volume of fluid that is dispensed into a receptacle throughout the remainder of dispensing operation. This may be checked, for example, by weighing the receptacles filled at the beginning of dispensing operation, and then comparing those weights to the weights of the receptacles that received the dispensed fluid throughout the dispensing operations. The weights of the receptacles should be substantially equal.

Figure 3:
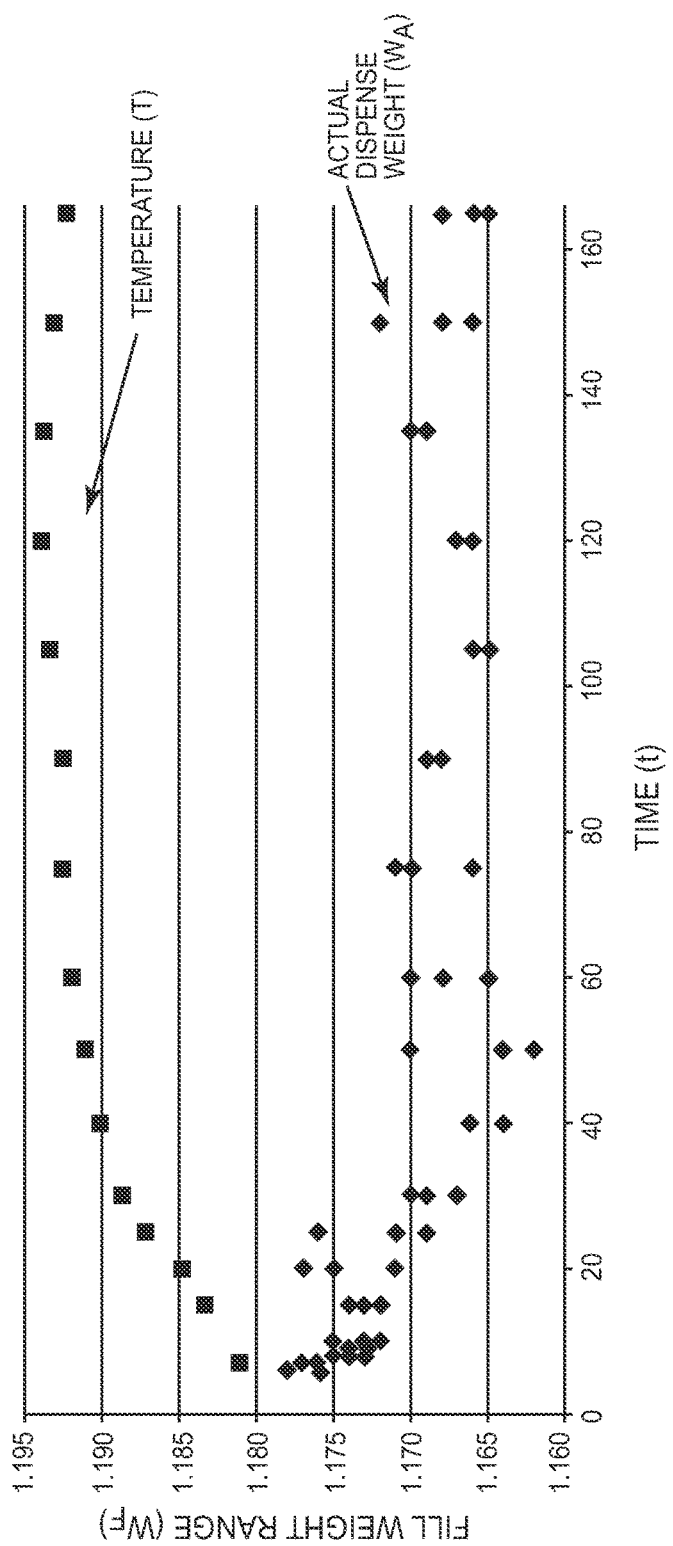
FIG. 3 illustrates a Cartesian graph indicating dispense weight data relative to an operating temperature of a valve.

FIGS. 3-7 are graphs illustrating test results conducted on a valve, such as valve 38, which was heated in accordance with embodiments of the present disclosure. More particularly, FIG. 3 is a Cartesian graph indicating dispense weight data relative to the temperature of a valve, such as valve 38. The data seen in FIG. 3 is from a test conducted on a valve, such as valve 38, using a time-dispense filling system, such as the dispensing device 10 seen in FIGS. 1 and 2.

The fill weight range ($W_F$), which may be on the order of 1-2 grams in some embodiments, for example, is on the abscissa or Y axis and the elapsed time (t) in minutes is on the ordinate or X axis. The lower data set (indicated using a '♦' symbol) represents the actual measured weights of random samples of the dispensed volume of fluid recorded over a 165 minute time period. During this test period, valve temperatures (T) (indicated using a '■' symbol) were recorded at the time the fluid being weighed was dispensed, and are scaled to fit the graph.

The graph in FIG. 3 demonstrates that initially, the actual measured dispense weight ($W_A$) of the samples varies inversely to the valve temperature (T). That is, as the valve temperature (T) increases, the actual weight of the volume of fluid that is dispensed decreases. However, at around t=50 minutes, this "drift" in the actual dispense weight ($W_A$) levels off as the valve temperature (T) stabilizes. That is, both the dispense weight ($W_A$) and valve temperature (T) reach equilibrium with respect to each other at a specific valve temperature (T). Therefore, there is a direct correlation between the temperature (T) of the valve and the actual dispense weight ($W_A$) of the fluid into the receptacle. Particularly, rising valve temperatures (T) cause the dispense weights ($W_A$) to also vary, but only until the valve temperature (T) stabilizes. Once the temperature stabilizes at a particular operating temperature, the dispense weights also stabilize and remain substantially the same.

For the test that produced the results of FIG. 3, the dispense weights ($W_A$) and valve temperatures (T) are inversely proportional and drift in opposite directions, at least initially. However, it should be noted that the direction of such drift may depend on varying parameters, such as the configuration of the valve being tested, for example. For valves having different configurations, the valve temperature (T) and the dispense weights ($W_A$) may drift in the same direction.

Figure 4:
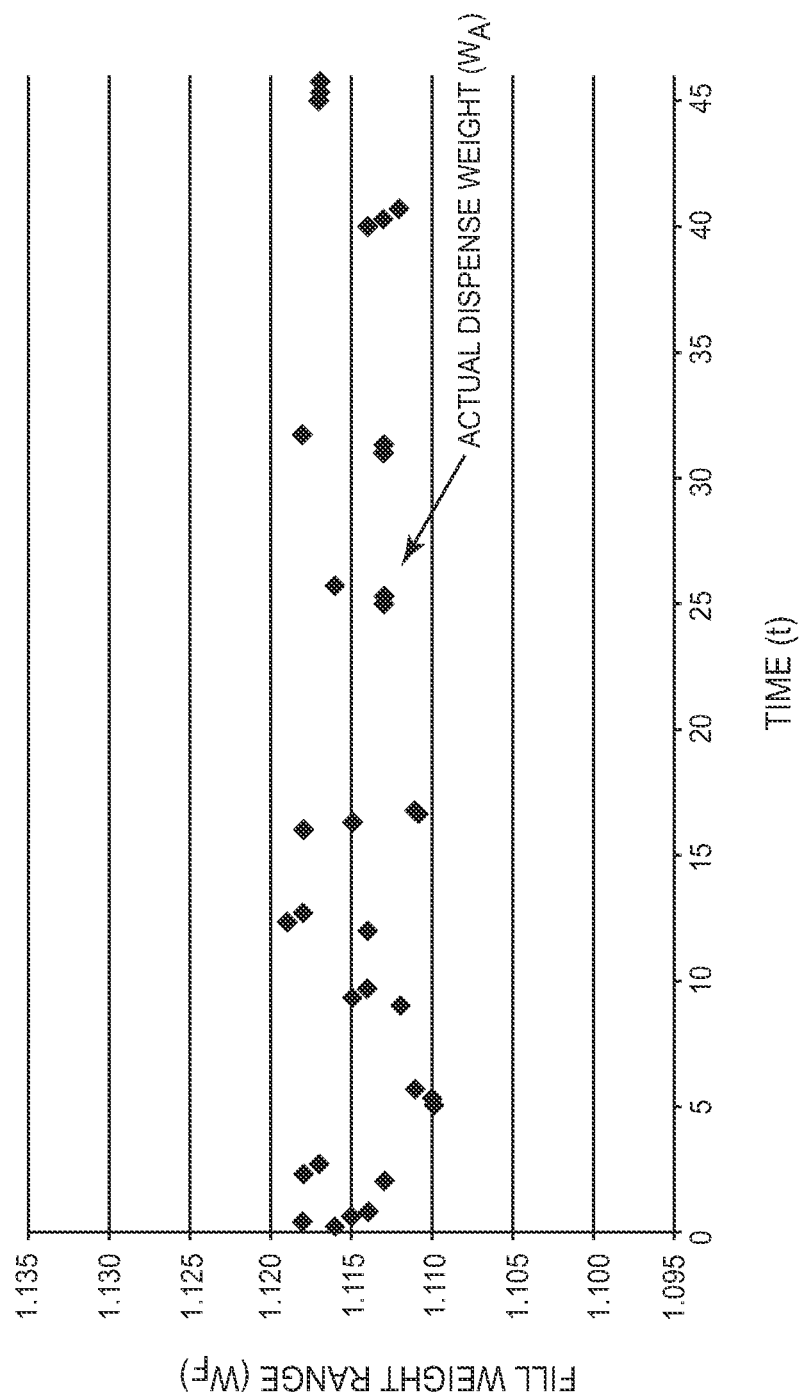
FIG. 4 illustrates a Cartesian graph indicating the dispense weight data from another test conducted on a valve of a time dispense filling system.

FIG. 4 is another Cartesian graph illustrating the dispense weight data from another test conducted on a valve of a time dispense filling system, such as valve 38 on dispensing device 10. As in the previous embodiment, the fill weight range ($W_F$) is on the abscissa or Y axis and the elapsed time (t) in minutes is on the ordinate or X axis.

The data set seen in FIG. 4 represents random samples of the actual measured weights ($W_A$) of the dispensed fluid in the receptacles recorded over 1000 dispense cycles. During the test period, which is about 45 minutes in length, the valve temperatures T are not recorded on the graph. This is because, before dispensing operations began, the valve under consideration was first pre-heated to a target operating temperature. That target operating temperature, which was computed for the valve as described in more detail below, was then substantially maintained for the duration of the test.

The results of preheating a valve to a target operating temperature, and then maintaining the valve at that temperature, can be seen from the graph in FIG. 4. That is, the actual dispense weights $W_A$ of the samples under these conditions are substantially stable throughout the test. In fact, the actual dispense weights $W_A$ of the samples remained within a range of about 7 milligrams. Further, the actual dispense weights $W_A$ do not drift as they did in the first 50 minutes of the test of FIG. 3 when the valve temperature T was increasing.

Therefore, the actual dispense weights $W_A$ of the fluid that is dispensed into the receptacles will not substantially drift when the valve is first pre-heated to a target operating temperature that is computed for that valve before dispensing operations begin, and then maintained at that temperature during dispensing operations. As stated above, this target operating temperature for any given valve in dispense device 10 may be computed, at least in part, based on the type of valve that is being used. Thus, valves of different types could possibly have different computed target operating temperatures. Additionally, however, the amount of time that a valve is open or "on" also affects the target operating temperature. One way to determine this "on" time is based on a selected "duty cycle" for that valve (i.e., a percentage of time that the valve is open relative to the total time that the valve is open and closed for one complete cycle of operation).

Figures 5A, 5B:
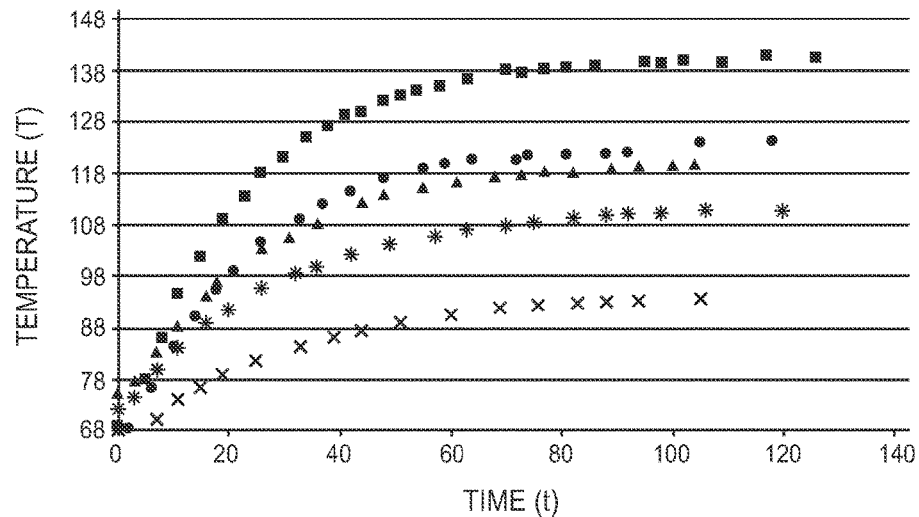
FIG. 5A illustrates a Cartesian graph indicating the results for each of five (5) different tests in which operating temperature readings for a valve were measured at different duty cycles.
FIG. 5B illustrates a tabular compilation of the test result data seen FIG. 5A.

FIGS. 5A and 5B illustrate this aspect of the present disclosure according to one embodiment. Particularly, FIG. 5A is a Cartesian graph illustrating the results for each of five (5) different tests in which temperature readings for a pinch valve (e.g., valve 38) were measured as the pinch valve was actuated to pinch and release its corresponding tubing (e.g., dispense tube 36) at different duty cycles. The valve temperature range T is indicated on the abscissa or Y axis while the elapsed time t in minutes is indicated on the ordinate or X axis. FIG. 5B illustrates a tabular compilation of the test result data seen FIG. 5A.

As seen in these figures, each test on the pinch valve was conducted at a different duty cycle.

0.5 s ON-3 s OFF for the test indicated using the symbol 'X';

0.5 s ON-1.5 s OFF for the test indicated using the symbol '*';

1.0 s ON-2.0 s OFF for the test indicated using the symbol '▲';

1.0 s ON-1.5 s OFF for the test indicated using the symbol '●'; and 1.0 s ON-1.0 s OFF for the test indicated using the symbol '■'.

The duty cycle, as seen in FIG. 5B, is expressed in terms of a percentage, and is computed using the following formula:

$$\text{Valve Time ON}/(\text{Valve Time ON} + \text{Valve Time OFF}) \quad (1)$$

Each test indicates that a different target operating temperature T is achieved for the same pinch valve for each different duty cycle. Further, the computed target operating temperatures T for the pinch valve increase with the higher duty cycle percentage values. Using the duty cycle information, along with the valve type, enables a dispensing device 10 configured according to the embodiments of the present disclosure to compute a predicted target operating temperate for any given valve. This computed operating temperature is the target temperature to which the valve is preheated and maintained during dispensing operations.

Figure 6:
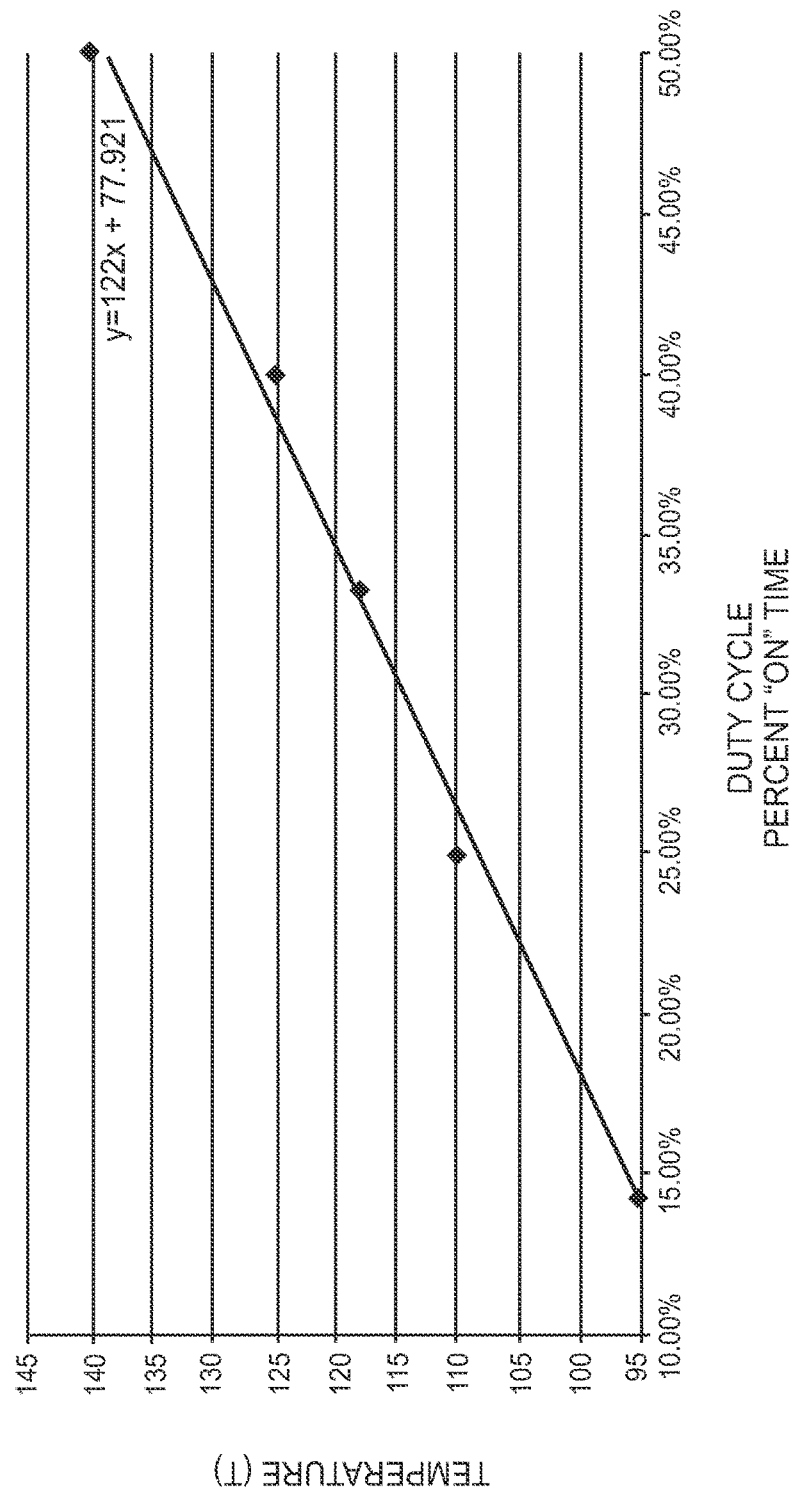
FIG. 6 illustrates a Cartesian graph indicating a formula used to compute a target operating temperature for a valve according to one embodiment of the present disclosure.

FIG. 6 is a Cartesian graph illustrating a formula used to compute the operating temperature for a given valve according to one embodiment of the present disclosure. In FIG. 6, there are five (5) data points—one data point arbitrarily selected for each of the five (5) tests seen in FIGS. 5A-5B, plotting the duty cycle versus corresponding maximum temperature achieved. The temperature range T is on the abscissa or Y axis while the Duty Cycle is on the ordinate or X axis. The data points, indicated here using a '♦' symbol, are selected arbitrarily and represent the operating temperature for each test plotted against the Duty Cycle value. Using a Least Squares Fit, for example, a regression line that best fits the data points is computed. This regression line, expressed as a formula $$y = mx + b \quad (2)$$

where:
y is the computed equilibrium temperature;
m is the slope of the regression line;
x is the Duty Cycle expressed as a percentage; and
b is the y-intercept,
is then used to configure a processing circuit associated with the dispensing device 10 to compute the target operating temperature to which the valve should be preheated prior to the start of dispensing operations, and maintained throughout dispensing operations.

As seen in the embodiment of FIG. 6, the formula for the particular type of pinch valve under test is:

$$y = 122x + 77.921 \quad (3)$$

where:
y is the computed equilibrium temperature;
122 is the slope of the regression line;
x is the Duty Cycle expressed as a percentage; and
77.921 is the y-intercept.
Thus, for a Duty Cycle of 40%, the computed equilibrium temperature y for the valve is:

$$y = 122(0.40) + 77.921$$

$$y = 48.8 + 77.921$$

$$y = 126.721°$$

Figure 7:
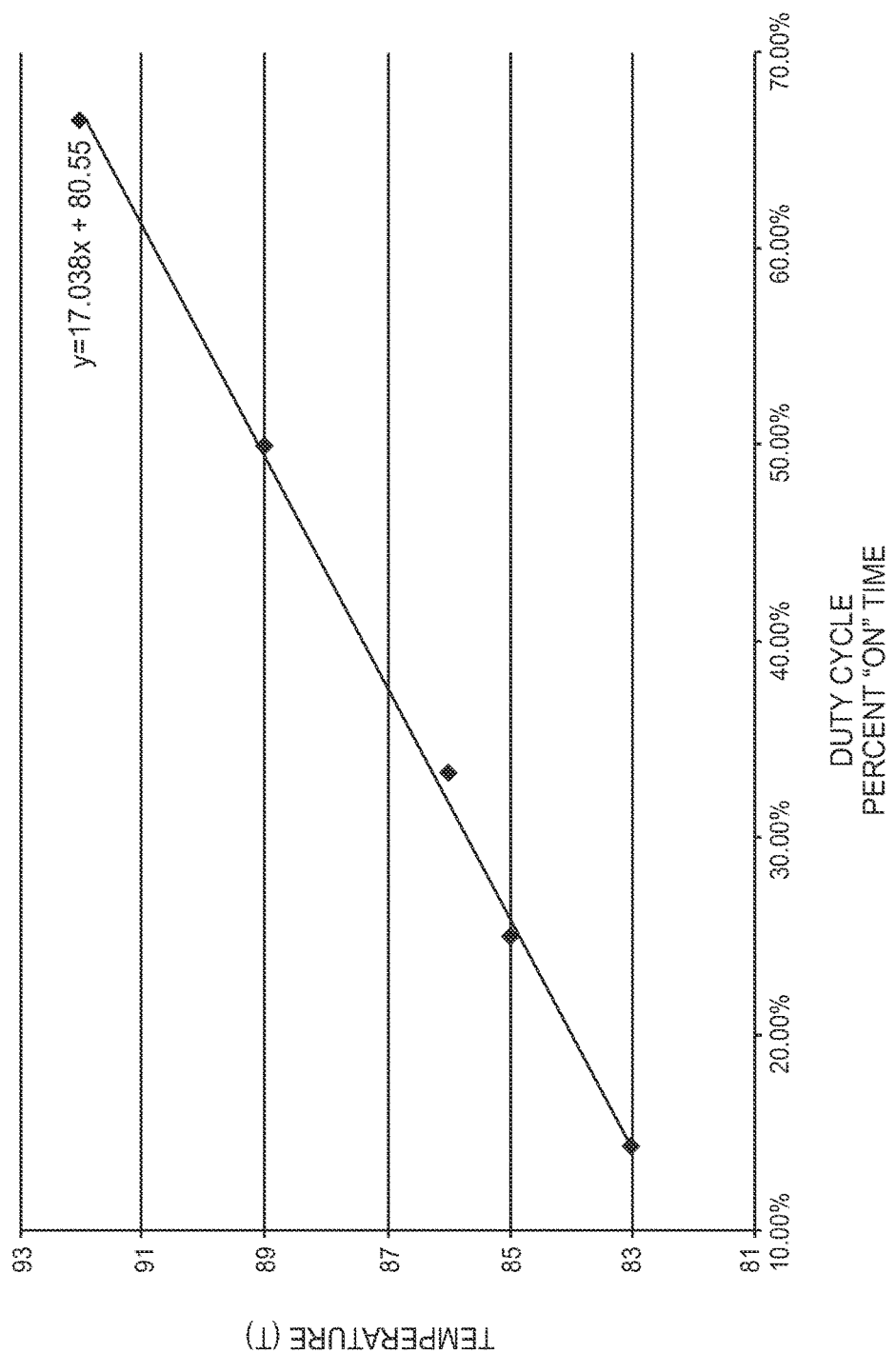
FIG. 7 illustrates a Cartesian graph indicating the results of a test conducted on a valve connected to a COLD CUBE device according to one embodiment of the present disclosure.

FIG. 7 is another Cartesian graph illustrating the results of a test conducted on a valve with a COLD CUBE device. The COLD CUBE, which is supplied by the BIO-CHEM VALVE Company, is a device that reduces a voltage to a valve immediately after the valve is energized or turned ON. For example, a valve with a COLD CUBE device may be energized using 24 volts. Immediately after the valve is energized, however, the voltage may be reduced to 8 volts, for example. Reducing the voltage lowers the operating temperature of the valve, but it also alters the formula used to compute the target operating temperature.

More particularly, the target operating temperature in FIG. 7 is on the abscissa or Y axis and Duty Cycle is on the ordinate or X axis. The data points selected for this test are similar to the data points seen in the graph of FIG. 6. However, as stated above, this test was conducted with a valve connected to a COLD CUBE device. Therefore, because of the type of valve, and the use of a COLD CUBE device, the target operating temperature for each data point is lower than those seen above in FIG. 6. However, the temperature of the valve is still increased. For FIG. 7, the formula used to configure a processor circuit to compute the predetermined temperature is:

$$y = 17.038(x) + 80.55 \quad (5)$$

For a COLD CUBE device with a 40% Duty Cycle, the predetermined temperature for preheating the device is:

$$y = 17.038(0.40) + 80.55$$

$$y = 6.8152 + 80.55$$

$$y = 87.3652°$$

Figure 8:
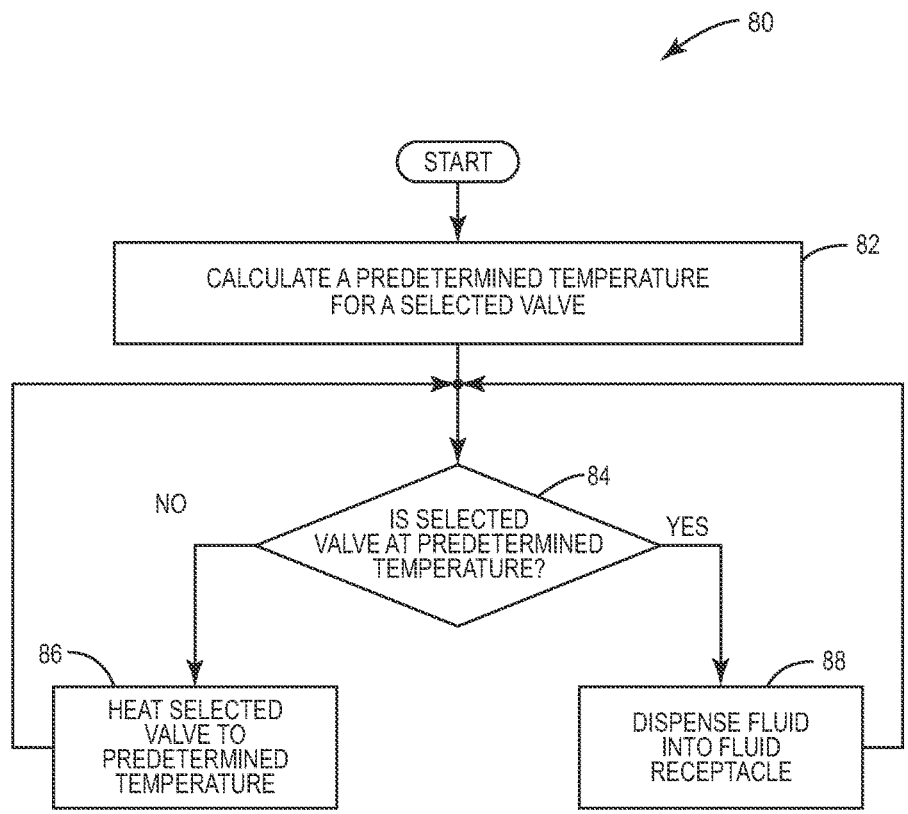
FIG. 8 is a flow diagram illustrating a method for dispensing a predetermined volume of fluid into a receptacle according to one embodiment of the present disclosure.

FIG. 8 is a flow diagram illustrating a method 80 of dispensing a predetermined volume of fluid into a receptacle according to one embodiment of the present disclosure. Although the following description of FIG. 8 specifically identifies the valve being heated as valve 38, those of ordinary skill in the art should appreciate that this is for illustrative purposes only. Method 80 may be used by the dispensing device 10, or any other device using an electronic pinch valve, to heat any valve associated with dispensing device 10, and further, may be utilized to heat multiple valves associated with dispensing device 10.

Method 80 begins with a processor circuit of a controller associated with the dispensing device 10 calculating a target operating temperature for valve 38 (box 82). As stated previously, the target operating temperature may be computed using the equation identified above, and is based on a type for the valve 38, and/or a selected duty cycle for the valve 38. Once an appropriate target operating temperature for valve 38 has been calculated, the processor circuit will determine whether the valve 38 is already at the target operating temperature (box 84). In one embodiment, for example, a thermal sensor associated with valve 38 periodically (or in response to a command received from the processor circuit) detects the current operating temperature of valve 38 and sends that information to the processor circuit. Until the processor circuit determines that the actual operating temperature of valve 38 has reached or exceeded the target operating temperature, the processor circuit will heat the valve 38 while refraining from dispensing the fluid (box 86). Such situations may occur, for example, at the beginning of dispensing operations, or after some time period in which the dispensing device 10 (or valve 38) has been idle. However, if the processor circuit determines that the current operating temperature of valve 38 is at or near the target operating temperature, the processor circuit will generate and send one or more control signals to valve 38 thereby energizing valve 38 causing it to open to dispense fluid into the receptacle (box 88). Valve 38 will remain open for a predetermined time period, for example, to dispense the fluid into the receptacle before the processor circuit generates a control signal to de-energize valve 38 causing it to close valve 38 thereby finishing the duty cycle.

This process—i.e., checking the current valve temperature and heating or dispensing the fluid from fluid reservoir 12 based on that valve temperature—continues throughout dispensing operations. Thus, not only is the dispensing device 10 of the present disclosure configured to preheat one or more valves to a specified target temperature prior to beginning dispensing operations, but is also configured to maintain valve 38 at that temperature after dispensing operations begin.

Figure 9:
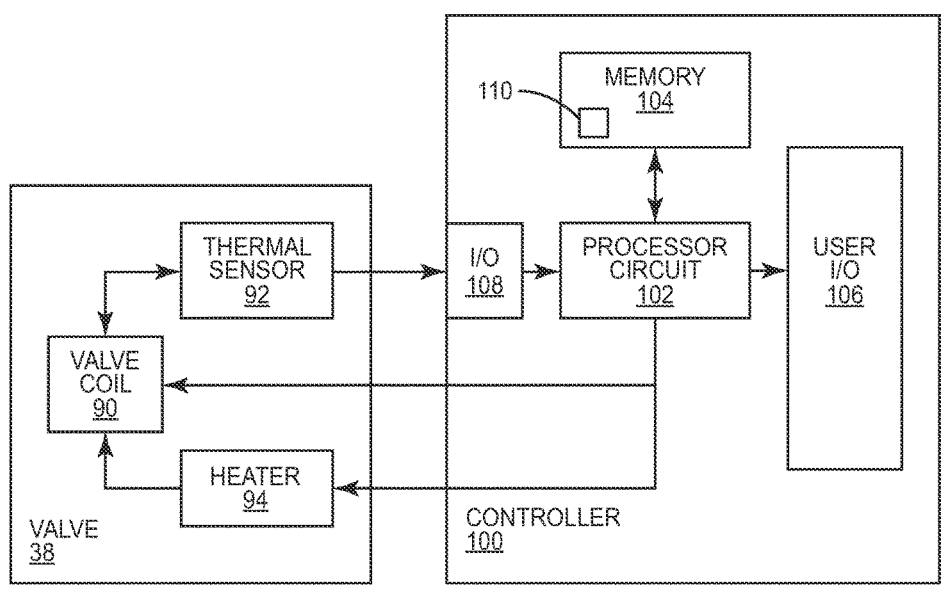
FIG. 9 is a block diagram illustrating a valve and a controller programmed to preheat the valve according to one or more embodiments of the present disclosure.

FIG. 9 is a block diagram illustrating a valve 38 and a controller 100 that is programmed to control the valve 38 to preheat valve 38 according to one or more embodiments of the present disclosure. As seen in FIG. 9, valve 38 comprises a valve coil 90, a thermal sensor 92, and a heater circuit 94. Other components may or may not be present, as is known in the art.

As stated above, the dispense valve 38 is controlled to manage the flow of fluid into the receptacle. While open, fluid is allowed to flow from the fill tube 30 and into the bottles or containers via dispense tube 36. When closed, fluid is not permitted to flow from the fill tube 30 and into the bottles or containers via dispense tube 36. To accomplish this, valve coil 90 responds to signals (e.g., different voltages) generated by and received from the controller 100. Particularly, the signals from the controller 100 affect a magnetic field of the valve coil 90, which in turn, drives a mechanical force necessary to energize and de-energize the valve 38.

The valve coil 90 may comprise, for example, an electromagnetically inductive coil wound around an armature in solenoid S, which may or may not be integrated with valve 38. The operational details of such valve coils 90 are well understood by those of ordinary skill in the art, and thus, not described in detail here. However, it should be noted that the temperature of the valve coil 90 increases with time. This temperature is detected by the thermal sensor 92, which then relays that temperature information back to the controller 100.

The heater 94 heats the valve coil 90 responsive to control signals received from the controller 100. The heater 94 may comprise, for example, a conventional band heater or a miniature heat blanket. However, for some embodiments, these particular heating devices may be cumbersome or ill-fitting. Additionally, such devices may not be suitable for sterile applications of the dispensing device 10. Therefore, in one embodiment, the heater 94 comprises a thermocouple attached to the body of valve 38. Responsive to receiving signals generated by the controller 100, the heater 94 heats the valve coil 90. The thermal sensor 92 reads the current temperature of the valve coil 90 and returns signals to the controller 100, as previously stated. If the current temperature of the valve coil 90 is below the predetermined operating temperature, the controller 100 generates a signal that closes an electromechanical relay in the heater 94 thereby allowing an electrical "heating" current to pass onto the valve coil 90. That electrical current is at a selected voltage great enough to heat the valve, but not great enough to energize the valve. Although the voltage selected may be any voltage desired, the selected voltage in one embodiment is less than one-half the valve's 38 operating voltage, and is applied to the valve 38 when the valve 38 is closed.

In some cases, applying the current to heat a valve before the valve is fully closed may inadvertently keep the valve energized or in the open state. Therefore, one embodiment of the present disclosure compensates for this by providing a short time delay (e.g., 25 ms.) between a time when the valve 38 is de-energized and a time the heating current is applied to the valve 38. This time delay, which may be any value needed or desired, allows the valve 38 enough time to fully close. Thus, in this case, the current may be applied to heat the valve 38 without opening the valve 38 using half the normal voltage for the valve 38.

The controller 100 is a device that controls the operation of valve 38 according to embodiments of the present disclosure. Particularly, as seen in FIG. 9, the controller 100 comprises a processor circuit 102, a memory 104, a user input/output (I/O) interface 106, and a communications I/O port 108.

The processor circuit 102 may comprise any programmable circuit known in the art, such as a microprocessor, for example, and communicatively interconnects the memory 104 and the user I/O 106. The processor circuit 102, based on the execution of code and instructions stored in memory 104, is configured to receive signals from the thermal sensor 92 via I/O circuit 108. Based on those signals, the processor circuit 102 is configured to generate the signals to the heater 94 to preheat valve 38 to a target operating temperature, and to maintain the valve 38 at that target operating temperature.

The memory 104 may comprise any non-transitory computer readable storage medium known in the art. Such devices include, but are not limited to, an electronic, magnetic, optical, electromagnetic, or semiconductor system, apparatus, or device, or any suitable combination thereof. While it is a non-exhaustive list, some specific examples of a computer readable storage medium suitable for use with the controller 100 include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination thereof. In one embodiment, the memory 104 stores the code, information, and data 110 that configures the processor circuit 102 to compute the target operating temperature for valve 38.

The user I/O 106 comprises the devices, such as a display and a keypad, for example, that allows an operator of the dispensing device 10 to enter data and commands to control the valve 38. Such information may comprise, for example, the properties and operating characteristics of valve 38, as well as the commands that affect the operation of the valve 38.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method for dispensing a predetermined volume of fluid, the method comprising:
   computing a target operating temperature for a valve of a dispensing device configured to dispense a predetermined volume of fluid, wherein computing the target operating temperature comprises:

determining a duty cycle for the valve, wherein the duty cycle is defined by a time that the valve is open relative to a total time that the valve is open and closed for a cycle; and computing the target operating temperature based on the duty cycle for the valve; and pre-heating the valve to the target operating temperature before dispensing the predetermined volume of fluid, wherein pre-heating the valve to the target operating temperature before dispensing the predetermined volume of fluid comprises:

determining whether a current operating temperature of the valve equals or exceeds the target operating temperature computed for the valve;

delaying the dispensing of the predetermined volume of fluid if the current temperature of the valve is less than the target operating temperature computed for the valve; and dispensing the predetermined volume of fluid if the current temperature of the valve is not less than the target operating temperature computed for the valve.

2. The method of claim 1 wherein the target operating temperature is further computed based on valve type.

3. The method of claim 1 wherein computing the target operating temperature based on the duty cycle for the valve comprises:

determining an equilibrium temperature for the valve at each of a plurality of different duty cycles;

associating the equilibrium temperature with the corresponding duty cycle; and storing the association in a memory circuit accessible to the dispensing device.

4. The method of claim 3 wherein computing the target operating temperature based on the duty cycle for the valve further comprises setting the target operating temperature for the valve to the equilibrium temperature associated with the duty cycle.

5. The method of claim 1 further comprising maintaining the valve at the target operating temperature while the dispensing device is dispensing the predetermined amount of fluid.

6. The method of claim 1 wherein pre-heating the valve to the target operating temperature comprises energizing the valve using a voltage that is less than that required to open the valve until a temperature of the valve equals or exceeds the target operating temperature computed for the valve.

7. The method of claim 1 wherein computing a target operating temperature for a valve comprises computing the operating temperature according to:

$$y=mx+b$$

where:
y is the computed target operating temperature;
m is the slope of a regression line;
x is the Duty Cycle expressed as a percentage; and
b is the y-intercept.

8. A fluid dispensing apparatus for dispensing a predetermined volume of fluid into a fluid receptacle, the apparatus comprising:

a fluid reservoir configured to hold a fluid to be dispensed;
a conduit configured to carry the fluid from the fluid reservoir to the fluid receptacle;
a valve configured to control a flow of the fluid through the conduit; and
a processing circuit configured to:

compute a target operating temperature for the valve, wherein to compute the target operating temperature, the processing circuit is configured to:

determine a duty cycle for the valve, wherein the duty cycle is defined by a time that the valve is open relative to a total time that the valve is open and closed for a cycle; and compute the target operating temperature based on the duty cycle for the valve; and pre-heat the valve to the target operating temperature before the apparatus dispenses the predetermined volume of fluid, wherein to pre-heat the valve to the target operating temperature before dispensing the predetermined volume of fluid, the processing circuit is configured to:

determine whether a current operating temperature of the valve equals or exceeds the target operating temperature computed for the valve;

delay the dispensing of the predetermined volume of fluid if the current temperature of the valve is less than the target operating temperature computed for the valve; and dispense the predetermined volume of fluid if the current temperature of the valve is not less than the target operating temperature computed for the valve.

9. The fluid dispensing apparatus of claim 8 wherein the target operating temperature is further computed based on valve type.

10. The fluid dispensing apparatus of claim 9 wherein to compute the target operating temperature based on the duty cycle for the valve, the processing circuit is configured to:

determine an equilibrium temperature for the valve at each of a plurality of different duty cycles;

associate the equilibrium temperature with the corresponding duty cycle; and store the association in a memory circuit accessible to the dispensing device.

11. The fluid dispensing apparatus of claim 10 wherein to compute the target operating temperature based on the duty cycle for the valve, the processing circuit is configured to set the target operating temperature for the valve to the equilibrium temperature associated with the duty cycle.

12. The fluid dispensing apparatus of claim 11 wherein the processing circuit is further configured to maintain the valve at the target operating temperature while the dispensing device is dispensing the predetermined amount of fluid.

13. The fluid dispensing apparatus of claim 8 wherein to pre-heat the valve to the target operating temperature, the processing circuit is configured to energize the valve using a voltage that is less than that required to open the valve until a temperature of the valve equals or exceeds the target operating temperature computed for the valve.

14. The fluid dispensing apparatus of claim 8 wherein the processing circuit is further configured to compute the target operating temperature using:

$$y=mx+b$$

where:
y is the computed target operating temperature;
m is the slope of a regression line;
x is the Duty Cycle expressed as a percentage; and
b is the y-intercept.

* * * * *